United States Patent [19]
Suzuki et al.

[11] Patent Number: 6,034,180
[45] Date of Patent: Mar. 7, 2000

[54] RESIN COMPOSITION

[75] Inventors: Toshinori Suzuki, Nihonmatsu; Katsutoshi Ishioka, Fukushima, both of Japan

[73] Assignee: NOK Corporation, Tokyo, Japan

[21] Appl. No.: 09/035,071

[22] Filed: Mar. 5, 1998

[30] Foreign Application Priority Data

Mar. 5, 1997 [JP] Japan ..................................... 9-067248

[51] Int. Cl.$^7$ ..................................... C08L 61/14
[52] U.S. Cl. ..................... 525/132; 525/133; 525/133.5; 525/134
[58] Field of Search ................. 525/133, 133.5, 525/134, 132

[56] References Cited

U.S. PATENT DOCUMENTS

| | | | |
|---|---|---|---|
| 4,267,285 | 5/1981 | Broutman | 525/145 |
| 4,476,277 | 10/1984 | Koyama et al. | 525/134 |
| 5,179,145 | 1/1993 | Wright | 524/147 |
| 5,559,179 | 9/1996 | Mori et al. | 524/494 |

FOREIGN PATENT DOCUMENTS 59-155620  4/1984  Japan .

OTHER PUBLICATIONS

Kopf, Phenolic Resins, Encyclopedia of Chemical Technology, vol. 18, p. 629, 1996.
Saechtling, Plastic Handbook, pp. 80–84 and pp. 110–116, 1987.
Van Krevelen, Properties of Polymers, pp. 119–120

*Primary Examiner*—David W. Wu
*Assistant Examiner*—Ling-Siu Choi
*Attorney, Agent, or Firm*—Jacobson, Price, Holman & Stern, PLLC

[57] ABSTRACT

A resin composition which comprises 50–97% by weight of thermoplastic resin with a melting or softening point of about 330° C. or below and 3–50% by weight of cured phenolic resin, in the form of powder, with an average particle diameter of about 500 μm or below. This resin composition is moldable into a sliding member having excellent mechanical properties in an aqueous environment and provides economical merit.

10 Claims, No Drawings

RESIN COMPOSITION

BACKGROUND OF THE INVENTION

1. Field of the Invention

The present invention relates to a resin composition, more particularly, to a resin composition suitable for use as a material from which underwater sliding members are molded.

2. Description of the Prior Art

For conventional slide members such as a bearing or the like used in an aqueous environment of aqueous systems, materials containing carbon fiber have been used because such materials have excellent characteristics. In practice, however, they are costly.

SUMMARY OF THE INVENTION

An object of the present invention is to provide a resin composition which is capable of being molded into a sliding member, used in an aqueous environment, and furthermore to provide a low cost resin composition for such a sliding member.

These objects of the present invention can be attained by using a resin composition which comprises 50 to 97% by weight of a thermoplastic resin having a softening point or a melting point not more than about 330° C. and a 3 to 50% by weight of a powdery cured phenol resin having an average particle diameter not more than about 500 µm.

DESCRIPTION OF THE PREFERRED EMBODIMENTS

The resin composition contains as a principal component a thermoplastic resin with a melting or a softening point of about 330° C. or below, which is exemplified by polyacetal, polybutylene terephthalate, polyethylene terephthalate, polyamide, polycarbonate, and polyphenylene sulfide. The thermoplastic resin is required to have a melting or a softening point as specified above so that the resin composition melts or softens at temperatures lower than about 330° C. (which is the decomposition point of the cured phenolic resin) during mixing with the cured phenolic resin in a twin-screw extruder or the like or during molding from the mixture (pellets), thereby suppressing the thermal decomposition of the cured phenolic resin.

The resin composition contains as another principal component a cured phenolic resin (of novolak type or resol type) in the form of powder with an average particle diameter of about 500 µm or below, preferably about 100 µm or below, which is small enough for the resin composition to undergo injection molding, compression molding, transfer molding, or the like. It will have an adverse effect on the strength of the resulting molded product when the average diameter of these cured phenolic resin particles are coarser than specified above. These particles may be used after surface treatment with aminosilane or the like.

According to the present invention, the cured phenolic resin in the form of powder accounts for 3–50% by weight, preferably 10–30% by weight, based on the total amount of the resin composition. When the amount of the cured phenolic resin, in the form of powder, in the total amount of the resin composition is more than the amount specified above, the mixing and molding properties of the resin composition are deteriorated. Whereas the amount of the phenolic resin in the form of powder in the total amount of the resin composition is less than the amount specified above, good sliding properties in an aqueous environment can not be obtained.

The powdery cured phenolic resin may contain an inorganic or organic fibrous or powdery filler, such as glass fiber, carbon fiber, and polytetrafluoroethylene powder. The filler may account for about 5–80% by weight, preferably 40–60% by weight based on the sum amount of phenolic resin and the filler. About 3 to 50% by weight of these filler-incorporated powdery cured phenol resins can be used in the resin composition, based on the total weight of the resin composition.

An inorganic or organic fibrous or powdery filler itself can be additionally added into the resin composition.

If the cured phenolic resin does not contain any filler, the resin composition may be incorporated with an inorganic or organic fibrous or powdery filler in an amount of about 5–80% by weight, preferably about 40–60% by weight based on the total amount of the cured phenolic resin, which contains no filler(s).

The resin composition of the present invention can be prepared, for example, by the following steps, first blending each predetermined amount of component, then second mixing and pelletizing the blended material by using a twin-screw extruder or the like. Molding of the thus obtained pellets is performed by injection molding, compression molding, transfer molding, or the like.

The invention will be described in more detail with reference to the following examples.

EXAMPLE 1

A resin composition was prepared from the following components by blending, followed by mixing and pelletizing in a twin-screw extruder. · 18% by weight of powdery cured phenol resin, which contained glass fiber, sieved into a powder having an average particle diameter of 20 µm (obtained by crushing sprue materials which was by-produced at injection molding, and screening the crushed spur materials into a powder having an average diameter of 20 µm. The sprue materials were made from the materials consisting of 40% by weight of novolak type phenol resin and 60% by weight of glass fiber having a fiber diameter of 13 µm and a fiber length of 3 mm);

82% by weight of polyacetal ("Duracon M90-44" manufactured by Polyplastics Co.).

The resulting resin composition was pelletized, and the pellets were injection-molded into specimens of prescribed shape.

The specimens were tested for underwater sliding properties (coefficient of friction, coefficient of wear, and temperature in the vicinity of sliding part) according to JIS K-7218A under the following conditions. Test conditions:

Environment: room temperature, underwater

Load: 0.5 MPa

Peripheral speed: 0.2 m/s

Duration: 24 hours

Mating member: S45C (1.5 s)

Testing machine: Suzuki type friction and wear testing machine

Comparative Example 1

The same procedure as in Example 1 was repeated except that specimens were prepared from polyacetal alone.

Comparative Example 2

The same procedure as in Example 1 was repeated except that specimens were prepared from polyacetal filled with 25% by weight of glass fiber ("Duracon GC-25" manufactured by Polyplastics Co.).

Comparative Example 3

The same procedure as in Example 1 was repeated except that specimens were prepared from polyacetal filled with 20% by weight of carbon fiber ("Duracon GE-20" manufactured by Polyplastics Co.).

The results in Example 1 and Comparative Examples 1 to 3 are shown in Table below.

| | | Example 1 | Comparative Example 1 | Comparative Example 2 | Comparative Example 3 |
|---|---|---|---|---|---|
| Underwater sliding properties | Coefficient of friction (−) | 0.10 | 0.15 | 0.10 | 0.02 |
| | Coefficient of wear (×$10^5$ cm · s/ MPa · m · hr) | 25 | 740 | 70 | 18 |
| | Temperature in the vicinity of sliding part (° C.) | 23 | 23 | 27 | 24 |
| Relative material cost | | 1 | 0.9 | 1.2 | 8.9 |

What is claimed is:

1. A molded sliding member suitable for use in an aqueous environment formed from a resin composition which comprises 50%–97% by weight of a thermoplastic resin having a melting or a softening point of about 330° C. or below and 3%–50% by weight of cured phenolic resin having fiber filler of about 5%–80% by weight based on the total amount of the phenolic resin and the filler in the form of a powder having an average particle diameter of about 500 μm or below.

2. The molded sliding member suitable for use in an aqueous environment formed from a resin composition as defined in claim 1, wherein the average particle diameter of the cured phenolic resin powder is about under 100 μm or below.

3. The molding sliding member suitable for use in an aqueous environment formed from the resin composition as defined in claim 1, wherein the amount of the filler is in a range of about 40% to 60% by weight based on the total amount of the filler and the cured phenolic resin powder.

4. The molding sliding member suitable for use in an aqueous environment formed from the resin composition as defined in claim 1, further comprising an organic and/or inorganic fibrous or powdery material.

5. The molding sliding member suitable for use in an aqueous environment formed from the resin composition as defined in claim 4, wherein the amount of the fibrous or powdery material in the resin composition is in a range of about 5% to 80% by weight based on the total amount of the fibrous or powdery material and the cured phenolic resin.

6. The molding sliding member suitable for use in an aqueous environment formed from the resin composition as defined in claim 1, which is used for a molded material for an underwater sliding member.

7. A method for making a molded sliding member suitable for use in an aqueous environment comprising the steps of:

preparing a resin composition including 50%–97% by weight of a thermoplastic resin having a melting or a softening point of about 330° C or below and 3%–50% by weight of cured phenolic resin in the form of a powder having an average particle diameter of about 500 μm or below;

pelletizing the resin composition;

molding the pelletized resin composition into an underwater slide member; and using the slide member as a bearing in an aqueous environment.

8. The method as defined in claim 7, wherein pelletizing is carried out with a twin-screw extruder.

9. The method as defined in claim 7, wherein molding is carried out with a molding method selected from the group consisting of injection molding, compression molding and transfer molding.

10. The molding sliding member suitable for use in an aqueous environment formed from the resin composition as defined in claim 1, wherein the cured phenolic resin is sprue or flush materials.

* * * * *